United States Patent [19]

Bhatia

[11] 4,336,641
[45] Jun. 29, 1982

[54] BEARING SETTING PROCESS

[75] Inventor: Ravi R. Bhatia, Canton, Ohio

[73] Assignee: The Timken Company, Canton, Ohio

[21] Appl. No.: 21,232

[22] Filed: Mar. 16, 1979

[51] Int. Cl.$^3$ ............................................. B21D 53/10
[52] U.S. Cl. ........................ 29/148.4 A; 29/148.4 C;
 308/236; 308/244
[58] Field of Search .................. 29/148.4 A, 148.4 C;
 308/236, 244

[56] References Cited

U.S. PATENT DOCUMENTS

| | | | |
|---|---|---|---|
| 1,437,833 | 12/1922 | Buckwalter | 29/148.4 A |
| 1,632,495 | 6/1927 | Miller | 308/236 |
| 1,792,618 | 2/1931 | Van Derhoef | 308/236 X |
| 1,948,814 | 2/1934 | Gibson | 308/236 X |
| 2,018,221 | 10/1935 | Mueller | 308/236 |
| 2,726,561 | 12/1955 | Hill | 29/148.4 A |
| 2,939,750 | 6/1960 | Weckstein | 308/236 |
| 3,535,008 | 10/1970 | Buta | 308/236 |
| 3,680,935 | 8/1972 | Wurzel | 308/236 |
| 4,054,999 | 10/1977 | Harbottle | 29/148.4 A |

Primary Examiner—Francis S. Husar
Assistant Examiner—V. K. Rising
Attorney, Agent, or Firm—Gravely, Lieder & Woodruff

[57] ABSTRACT

Two indirectly mounted tapered roller bearings that are located between a spindle and a hub are set by first bringing one of the bearings into a condition of no end play and then measuring the distance between the cup of the second bearing and the end of the spindle. A spacer is then selected and fitted between the end of the spindle and an end plate that is bolted against the spindle. The end plate abuts against the back face of the cone for the second bearing, and the end plate position, which is controlled by the thickness of the spacer, determines the setting for the bearings. The proper thickness for the spacer is determined by subtracting the measured dimension from a value derived from a table.

6 Claims, 4 Drawing Figures

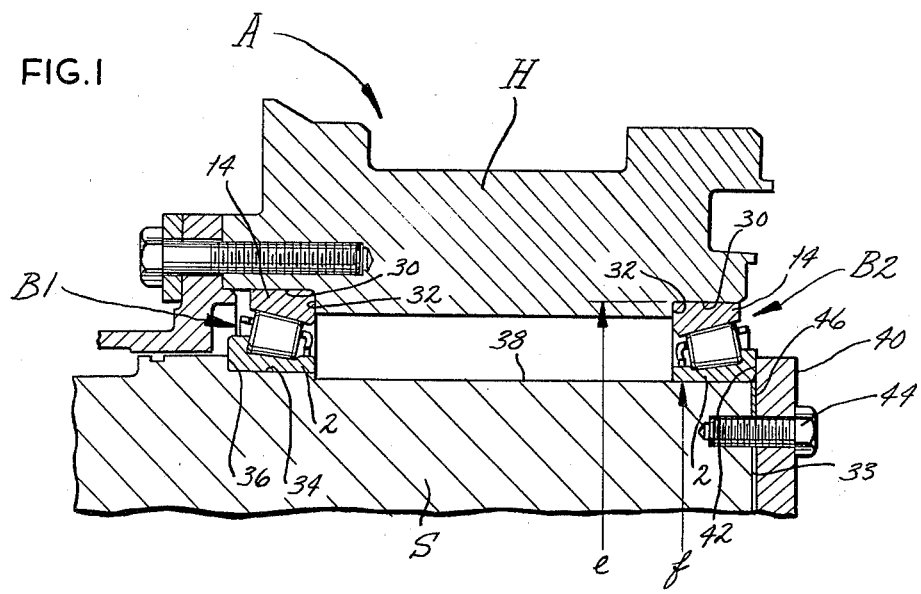
FIG.1
SUM OF CONE BORE & CUP O.D. DEVIATIONS
| BEARING STANDOUT DEVIATION – UNMOUNTED BEARING | | 2 | 3 | 4 | 5 | 6 | 7 | 8 | 9 | 10 | 11 | 12 | 13 | 14 |
|---|---|---|---|---|---|---|---|---|---|---|---|---|---|---|
| | A | .738 | .738 | .740 | .740 | .741 | .742 | .7425 | .743 | .744 | .745 | .7455 | .746 | .747 |
| | B | .739 | .740 | .741 | | | | | | | | | | |
| | C | .740 | .741 | .742 | | | | | | | | | | |
| | D | .741 | .742 | .743 | | | | | | | | | | |
| | E | .742 | .743 | .744 | | | | | | | | | | |
| | F | .743 | .744 | .745 | | | | | | | | | | |
| | G | .744 | | | | | | | | | | | | |
| | H | .745 | | | | | | | | | | | | |
| | I | .746 | | | | | | | | | | | | |
| | J | .747 | | | | | | | | | | | | |
| | K | .748 | | | | | | | | | | | | |
| | L | .749 | | | | | | | | | | | | |
| | M | .750 | | | | | | | | | | | | |
| | N | .751 | | | | | | | | | | | | |
| | O | .752 | | | | | | | | | | | | |
| | P | .753 | | | | | | | | | | | | |
| | Q | .754 | | | | | | | | | | | | |
| | R | .755 | | | | | | | | | | | | |
| | S | .756 | | | | | | | | | | | | |
| | T | .757 | | | | | | | | | | | | |
| | U | .758 | | | | | | | | | | | | |
| | V | .759 | | | | | | | | | | | | |
| | W | .760 | | | | | | | | | | | | |
| | X | .761 | | | | | | | | | | | | |
| | Y | .762 | | | | | | | | | | | | |
| | Z | .763 | | | | | | | | | | | | |
FIG.4
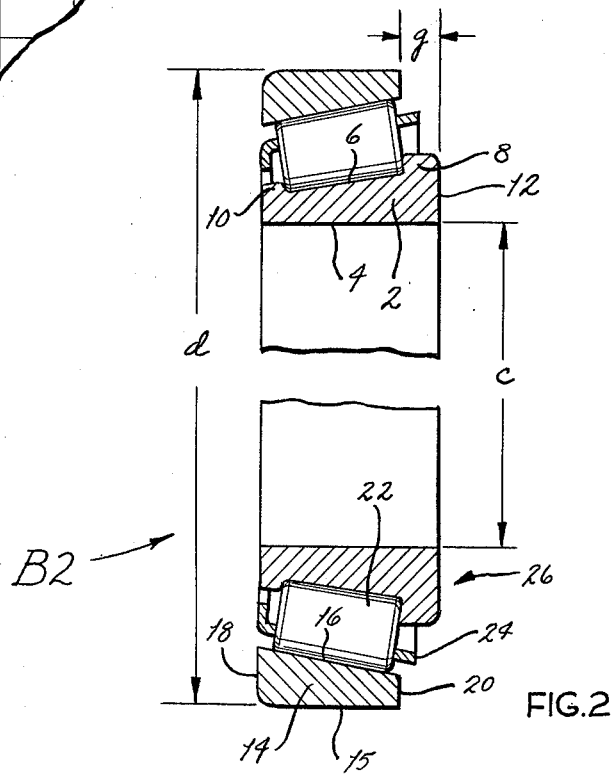
FIG.2

BEARING SETTING PROCESS

BACKGROUND OF THE INVENTION

This invention relates in general to a process for setting bearings and more particularly to a process which accounts for dimensional deviations without actually assembling the bearing.

Two tapered roller bearings when mounted in opposition produce a bearing arrangement that is capable of accommodating heavy radial loads as well as thrust loads in both axial directions. As a consequence this bearing arrangement finds wide spread use in automotive applications. For example, the nondriven wheels of automobiles and over-the-road trucks are usually mounted on spindles or axles by means of this arrangement. Usually the cup of each bearing is pressed into the hub of the wheel, while the cone assemblies (the cone, the tapered rollers, and the cage which holds the rollers around the cone) are fitted over the spindle or axle, whatever the case may be, such that the small diameter ends of the rollers are presented inwardly. This is known as an indirect mounting. The axial positions of the two cups and the two cones are critical for those positions determine the setting of the bearing arrangement. The setting may be one of end play in which the hub can move axially a short distance relative to the spindle or axle on which it is mounted, or it may be one of preload in which no axial play exists and the tapered rollers are actually compressed between their respective cups and cones for the full 360° of the two bearings. Excessive preload is undesirable since high friction develops in the bearings and substantial stresses are imposed on their raceways. As a result bearings adjuted to a condition of high preload fail much sooner than bearings adjusted to moderate preload or slight end play. Also a condition of high preload leaves the bearing arrangement with little or no capacity for accommodating thermal expansion. On the other hand, a condition of excessive end play does not provide the stability required, for it permits considerable wobbling of the wheel. It also lessens the life of each bearing.

In automobiles and most over-the-road trucks the bearing setting is adjusted quite easily and with adequate precision, merely by turning a nut that is threaded over the spindle or axle. This nut serves as a backing for the outboard cone and hence controls the spacing between the two cones. During the adjustment, the wheel is easily turned to insure that the tapered rollers of the two bearings seat against the raceways of their respective cups and cones and against the thrust ribs of the cones.

The typical arrangement of two indirectly mounted tapered roller bearings is also used in much larger equipment where adjustment procedures are not nearly so simple. For example, the wheels of large off-highway vehicles such as the trucks used at quarries and at strip coal mines, as well as the wheels on large excavating and mining equipment, are mounted with bearings that can exceed 30 inches in diameter. A single wheel and its mounting may weigh as much as 12,000 pounds.

The present procedure for installing a large wheel on a stub axle commences with orienting the stub axle in an upright position with its outboard end presented upwardly. The inboard cone is then heated to expand it enough to fit over the axle, and the entire cone assembly is moved downwardly over the stub axle until the back face of the cone comes against a shoulder. Also, the two cups are pressed into the wheel hub. Next the hub is lowered over the axle until the lower or inboard cup as well as the entire wheel is supported entirely on the lower or inboard cone assembly. The rollers of the lower bearing in this instance seat easily against the tapered raceways of the cone and cup, and the large diameter ends of the tapered rollers bear against the cone thrust rib, having originally dropped to that position by virtue of their own weight. Thus, no end play exists in the lower bearing at this step in the assembly procedure. Thereupon, the cone of the upper or outboard cone assembly is heated and that assembly is dropped onto the stub axle until its rollers come against the tapered raceway of the outer cup. The large diameter ends of the rollers may or may not seat against the cone thrust rib, but most likely they will not. Next, the individual assembling the mounting selects a shim pack, and the thickness of this pack is determined solely by his experience. Once the shim pack is in place, an end plate is installed on the outer end of the axle, and it serves as a backing for the outer cone. The end plate is held in place by a large number of bolts.

Installation of the end plate does not complete the assembly procedure, for the mounting must be checked to see if the bearings have the correct setting. This is achieved with dial indicators positioned to measure the relative movement between the hub and stub axle. With the dial indicators in place, the hub is attached to an overhead crane and lifted upwardly until the stub axle is suspended completely from the hub. The assembler then observes the dial indicators to determine if any change has occurred. Theoretically, the change in the measurement made by the dial indicators represents the end play in the bearing assembly. Often the measured end play does not fall within prescribed limits, in which case the end plate is removed and the shims are changed. After the end plate is replaced, the end play is again measured by lifting the hub with a crane. This procedure for measuring may be repeated several times. The foregoing procedure is not only time consuming, but it is also not very precise and can lead to errors of a substantial magnitude. First, the dial indicators do not actually reflect end play, but instead they meausre end play plus deflection of the bearing and its related mounting components. In this regard, the bearing and mounting components are not entirely rigid and will deflect, particularly when subjected to heavy loads which are clearly present during the measuring procedure. Secondly, the tapered rollers of the outer bearing may not seat against the cone thrust rib, and indeed gravity urges them away from the thrust rib. Any spacing between the large diameter ends of the rollers and the cone thrust rib represents end play which is not measured. Third, the assembler may initially select a shim pack that places the bearing under severe preload, but this preload may incorrectly appear as end play due to deflection in the bearing and its mounting components. As a result the mounting may be released with its bearings set in a condition of excessive preload. Finally, even if such excessive preload is recognized before release of the mounting, the interference fit between the axle and the cone of the outer bearing presents additional complications. The assembler may simply replaces the initial shim pack with the correct shim pack, in which case the cone may control the spacing instead of the shim pack. Alternately the assembler may properly relieve the excessive preload by pressing the outer cone outwardly a slight distance before applying the corrected shim pack.

SUMMARY OF THE INVENTION

One of the principal objects of the present invention is to provide a process for quickly adjusting bearings with considerable precision. Another object is to provide a process of the type stated which is ideally suited for adjusting large diameter tapered roller bearings. A further object is to provide a process which greatly simplifies the procedure for adjusting large tapered roller bearing arrangements. An additional object is to provide a process of the type stated in which the adjustment is derived from a simple measurement and from a table. These and other objects and advantages will become apparent hereinafter.

The present invention is embodied in a process for setting a pair of bearings which together accommodate thrust loading in both axial directions as well as radial loading. The setting is dependent on a spacer that is located between the back face of one of the races and an abutment surface, and the thickness of this spacer is determined from a table which takes into account deviations from the nominal value of the bearing standout and deviations from the nominal dimension of at least one of the bearings at the surface where an interference fit exists. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur—

FIG. 1 is a fragmentary sectional view of a mounting having bearings adjusted in accordance with the process of the present invention;

FIG. 2 is an enlarged sectional view of the outer bearing in an unmounted condition;

FIG. 4 is a typical table used to determine the thickness of the spacer between cone of the outer bearing and the thrust ring.

DETAILED DESCRIPTION

Figure 3:
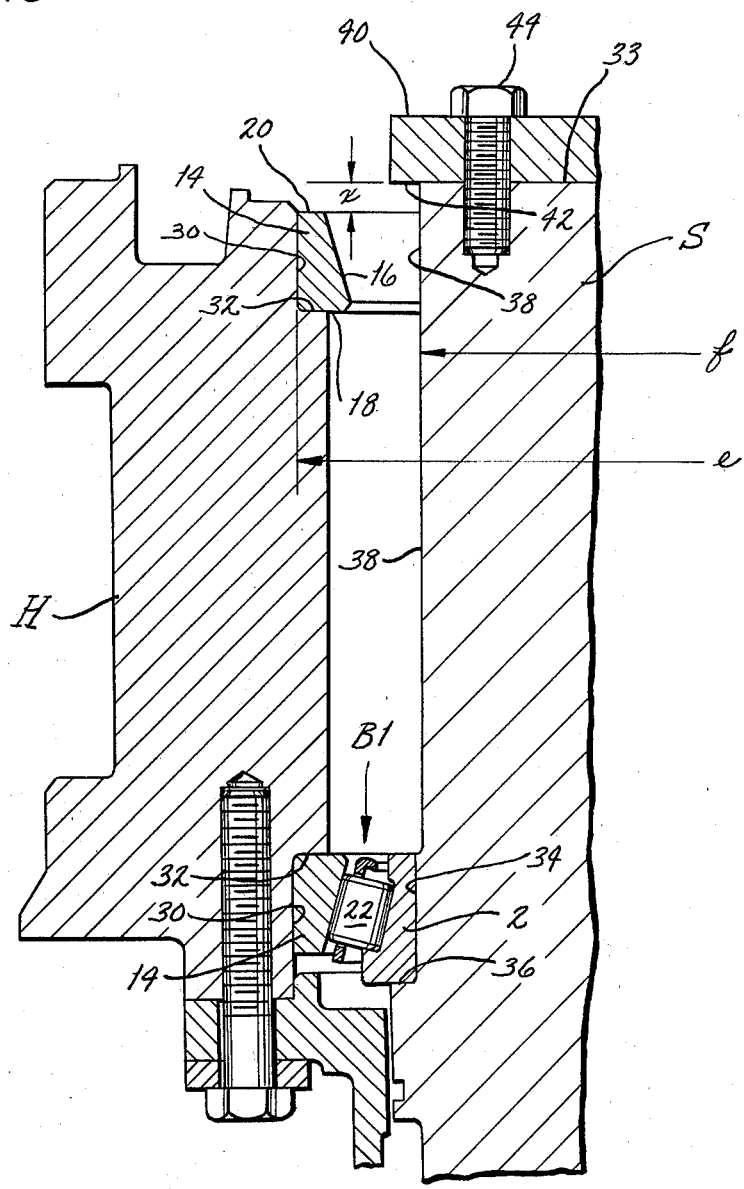
FIG. 3 is a sectional view of the mounting as the distance between the cup front face and the abutment surface for the cone back face is measured.

Referring now to the drawings (FIG. 1), A designates a wheel mounting which is assembled in accordance with the process of the invention, and this assembly process enables the bearings of the mounting A to be quickly adjusted to the proper setting with considerable precision. While the process is described and illustrated insofar as it is suitable for setting the bearings of large wheel mountings, it is also useful in setting bearings for other types of mountings, particularly where the bearings are large and have their races under interference fits. To understand the adjusting process requires an understanding of the mounting A itself.

Basically, the wheel mounting A (FIG. 1) includes a hub H on which a wheel (not shown) is mounted, a stub axle or spindle S about which the wheel revolves, and two single row tapered roller bearings B1 and B2 between the spindle S and hub H. The bearings B1 and B2 are indirectly mounted so that the bearing B1 takes thrust loads in one axial direction, while the bearing B2 takes the thrust loads in the other axial direction. Both bearings B1 and B2 accommodate radial loading. The center of the spindle constitutes the axis of rotation for the hub H and for the bearings B1 and B2 by which it is mounted.

The bearings B1 and B2 are identical in construction but are reversed in position so as to provide the indirect mounting. Each bearing B1 or B2 includes (FIG. 2) a cone 2 that fits around the spindle S and has a bore 4 extending through it, with the bore 4 having a nominal diameter C. The cone 2 also has an outwardly presented tapered raceway 6, a thrust rib 8 at the large diameter end of the raceway 6, and a retaining rib 10 at the small diameter end of the raceway 6. While one end of the thrust rib 8 forms an abutment surface adjacent to the tapered raceway 6, the other end constitutes the back face 12 of the cone 2, and that face is squared off with respect to the axis of rotation.

In addition to the cone 2, each bearing B1 or B2 includes cup 14 that surrounds the cone 2 and has a cylindrical outside surface 15 of nominal diameter d. The cup 14 also has an inwardly directed tapered raceway 16 which is located directly opposite the tapered raceway 6 on the cone 2 and tapers in the same direction. The raceway 16 extends from one end of the cup 14 to the other so that one end of the cup 14 has a larger surface area than the other. The larger surface area constitutes the cup back face 18, while the smaller area is the cup front face 20. Both are squared off with respect to the axis of rotation. Thus, the cup back face 18 is at one end of the bearing, while the cone back face 12 is at the other.

Interposed between the cup 14 and the cone 2 is a single row of tapered rollers 22, the tapered side faces of these rollers being against raceways 6 and 16 such that line contact is established between the rollers 22 and the two raceways 6 and 16. Indeed, the lines of contact if continued would intersect each other at the axis of rotation for the bearing B1 or B2. Moreover, the large diameter ends of the rollers 22 bear against the cone thrust rib 8 which prevents the rollers 22 from being expelled during operation. The proper circumferential spacing between the rollers 22 is maintained by a cage 24 which also occupies the space between the cup 14 and the cone 2. The cage 2 in cooperation with the ribs 8 and 10 of the cone 2 further holds the rollers 20 around the cone 2 when the cone 2 is removed from the cup 14, thereby forming a unitized assembly consisting of the cone 2, the rollers 22, and the cage 24. That unitized assembly is known as the cone assembly 26.

The hub H at each of its ends has an axially extending hub bore 30 (FIG. 1) that is concentric with the axis of rotation. Each bore 30 has a nominal diameter e and inwardly terminates at a shoulder 32. The bore 30 at the inner end of the hub H receives the cup 14 of the inner bearing B1, while the bore 30 at the outer end of the hub H receives the cup 14 of the outer bearing B2, the cups 14 being fully inserted into these respective bores 30 so that their back faces 18 abut against the shoulders 32. In this regard, the diameters e of the two bores 30 and the diameter d of the cup outside surfaces 15 are such that an interference fit will exist between each cup 14 and its respective bore 30. In other words, the diameter d is slightly larger than the diameter e. As a consequence, the cups 14 must be pressed into their bores 30 and will accordingly undergo some shrinkage.

The spindle S extends through the hub H and terminates at an end face 33 that is squared off with respect to the axis of rotation. In the vicinity of the inner end of the hub H, it has a raised cylindrical surfaces 34 (FIGS.

1 & 3) and a shoulder 36 at the end of that surface. The cone 2 of the inner bearing B1 fits over the surface 34 and has its back face 12 against the shoulder 36. An interference fit exists between bore 4 of the inner cone 2 and the raised surface 34, and accordingly, during assembly it is desirable to expand the cone 2 by heating it so that it will fit easily over the surface 34. Outwardly from the raised surface 34, the spindle S has a cylindrical end surface 38 of nominal diameter f. The cone 2 of the outer bearing B2 fits over the surface 38 with its back face 12 located slightly beyond the end face 33. The diameter f of the surface 38 and the diameter c of the bore 4 of the cone 2 for the bearing B2 are such that an interference fit exists between the cone bore 4 and the surface 38. Therefore, it is desirable to expand the cone 2 of the bearing B2 by heat when installing it over the surface 38.

To provide a positive backing for the cone 2 of the outer bearing B2, an end plate 40 is installed on the outer end of the spindle S, and this plate has an abutment face 42 that abuts the back face 12 of the core 2 for the outer bearing B2. The plate 40 is secured to the spindle S by bolts 44 which pass through it and thread into the outer end of the spindle S.

The space between the end face 33 of the spindle S and the abutment surface 42 on the end plate 40 is occupied by a spacer in the form of a shim pack 46 (FIG. 1), the thickness of which determines the setting for the two bearings B1 and B2, for it controls the spacing between the inner and outer cones 2. If the shim pack 46 is too thick, the bearings B1 and B2 will operate with excessive end play. On the other hand, if it is too thin, the bearings B1 and B2 will have excessive preload. Thus, the present process has as its end, the selection of the proper thickness for the shim pack 46.

While the outer bearing B2 is practically identical to the inner bearing B1, it does differ in one significant respect, that is, it is provided with a code representing deviations from nominal values of critical dimensions for the bearing B2. Those critical dimensions may be the diameter c of the cone bore 4, the diameter d of the cup outer surface 15, and the assembled bearing standout g which is the axial distance between the cup front face 20 and the cone back face 12 when the bearing B2 is unmounted and in a condition of zero end play (FIG. 2). In that condition, no outside forces are imposed on the cone 2 or cup 14 and the rollers 22 are seated against both the raceways 6 and 16, and further have their large diameter end faces against the cone thrust rib 8.

During the assembly of the mounting A a single measurement is made to determine the thickness of the shim pack 46, and that measurement is the distance X (FIG. 3) between the end face 33 on the spindle S and the front face 20 of the outer cup 14. The end face 33 constitutes a radial surface along the spindle S, while the front face 20 constitutes a location along the cup 14. Since the thrust rib 8 of the outer cone 2 projects through the measured space, one must know the magnitude of the actual bearing standout to determine the thickness of the shim pack 46. While the bearing standout has a nominal dimension g, rarely does the actual bearing standout for the unmounted bearing B2 correspond precisely to the nominal bearing stand g, since the bearing B2 is usually manufactured with a tolerance in the nominal standout g. Also, other factors influence the position at which the back face 12 of the cone 2 locates, as will be apparent from the subsequent discussion.

Thus, the deviation of the actual bearing standout from the nominal bearing standout g for the unmounted bearing B2 is critical to the determination of the thickness for the shim pack 46. The range of possible deviation from the nominal bearing standout g is divided into increments and each increment is assigned a letter. For example, each increment may be 0.001 inch and the total range in the tolerance may be from 0.013 inch short to 0.012 inch large. Thus, A might designate a deviation from the nominal bearing standout g of −0.013 inch; B would designate a deviation of −0.012 inch; while Z would designate a deviation of +0.012 inch. The code or letter representing the deivation in bearing standout g is preferably etched into the back face 12 of the cone 2. Since the letter code pertains to a dimension between the cup 14 and the cone 2 of the bearing B2, the bearing B2 msut be furnished as a matched set, that is a specific cup 14 and a specific cone assembly 26.

The diameter of the cone bore 4 for the outer cone 2 is also critical, for it has a direct relationship on the diameter of the cone raceway 6 when the cone 2 is mounted, and that diameter, in turn affects the position of the cone back face 12. Of course, when the cone 2 is placed over the cylindrical end surface 38 of the spindle S, it assumes an expanded condition due to the interference fit between the surface 38 and the cone bore 4. The cone raceway 6 therefore enlarges somewhat and this enlargement causes the rollers 22 to seat further outwardly on the cup raceway 16, thus causing the cone back face 12 to project further beyond the spindle end face 33. In other words, the interference fit between the cone bore 4 and the cylindrical end surface 38 expands the bearing B2 in the axial direction, thereby requiring additional thickness for the shim pack 46. The magnitude of the interference fit, which is a radial dimension, can through simple calculations be converted into an axial dimension representing the displacement of cone back face 12 as a result of the interference fit. This displacement is termed "lateral removed". The calculations for determining the lateral removed are well known to bearing manufacturers and therefore will not be discussed in detail. Hence, the so-called lateral which is removed as a result of the interference fit at the cone 2 is calculated, with the calculation being based on the nominal diameter c for the cone bore 4 and the nominal diameter f of the cylindrical end surface 38. A typical interference fit between the core bore 4 and spindle surface 38, when considered at nominal diameters c and d, may be 0.0040 inches tight.

However, the cone 2 is manufactured with a tolerance in its cone bore 4, so the actual diameter of the cone bore 4 will most likely be slightly different from the nominal diameter c. This tolerance is divided into increments which may be as small as 0.0005 inch, and each increment is assigned a number. For example, the tolerance for the diameter c of the cone bore 4 may be 0.000 inches to +0.003 inches. The numbers may be assigned as follows:

| Deviation from Nominal Diameter c | Code Numeral |
| --- | --- |
| 0 inches | 7 |
| +0.0005 | 6 |
| +0.0010 | 5 |
| +0.0015 | 4 |
| +0.0020 | 3 |
| +0.0025 | 2 |

-continued

| Deviation from Nominal Diameter c | Code Numeral |
|---|---|
| +0.0030 | 1 |

Thus, each number represents a specific deviation from the nominal diameter c of the core bore 4, and that deviation, whatever it may be, alters the lateral that is removed. The code numerals increase in relation to the magnitude of the increase in the interference fit (i.e., a cone bore 4 that is 0.0005 oversize produces a tighter fit than one that is 0.0030 oversize). The change in the lateral due to the deviation in the cone bore 4 from the nominal diameter c may be calculated in the same manner. Note that the numbers for the code increase in relation to the increase in the magnitude of the lateral that is removed.

The interference fit between the outer surface 15 of the cup 14 for the bearing B2 and the hub bore 30 results in further removal of lateral, requiring still greater thickness for the shim pack 46. More specifically, when the outer cup 14 is pressed into its bore 30, it contracts and so does the raceway 16 on it. As a result, the rollers 22 seat further outwardly on the raceway 16, and this expands the bearing B2 still further in the axial direction, thereby displacing the entire cone 2 so that its back face 12 locates even further beyond the spindle and face 33. The interference between the surface 15 and the hub bore 30 constitutes a radial dimension and is translated through known formulas into lateral which is an axial dimension. The lateral that is removed is calculated for the nominal value of the diameter d for the outside surface 15 on the cup 14 and for the nominal diameter e of the hub bore 30. This interference fit when considered at nominal values for a typical mounting A may be 0.0060 inches tight.

Again, the actual diameter of the outside surface 15 will rarely correspond precisely to its nominal diameter d, since the cup 14 is manufactured within prescribed tolerances. The tolerance for the outside surface 15 is likewise divided into increments, which correspond in magnitude to the increments for the cone bore 4 tolerances. Each increment is assigned a number. For example, the tolerance prescribed for the diameter d of the outside surface 15 may be 0.000 to +0.003 inces. The numbers may be assigned as follows:

| Deviation from Nominal Diameter d | Code Numeral |
|---|---|
| 0 inches | 1 |
| +0.0005 | 2 |
| +0.0010 | 3 |
| +0.0015 | 4 |
| +0.0020 | 5 |
| +0.0025 | 6 |
| +0.0030 | 7 |

Accordingly, each number represents a deviation from the nominal diameter d, and the deviation, whatever it may be, alters the lateral that is removed. The deviation is calculated using the standard formulas. As with the code for the cone bore 4 tolerance, it is important that the numbers of the code increase with the increase in the magnitude of the lateral that is removed.

The numerical code for the deviation in the cone bore 4 may be etched into the back face 12 of the cone 2 along with the letter code for the deviation in the unmounted bearing standout, while the numerical code for the deviation in the diameter d of the cup outer surface 15 may be etched into the cup front face 20. On the other hand, the two numerical codes may be added together and the sum may be etched into the cup front face 20. In either case the deviations in interference fits and the deviation in the bearing standout are presented on the bearing B2 in the form of a code.

The numerical and alphabetical codes correlate with a reference source in the form of a table that is prepared specifically for the wheel mounting A. The table along its vertical entry column has letters corresponding to all possible letter codes. Along its horizontal entry line, it has numerals which correspond to all possible numerical codes, assuming that the codes for the cone 2 and cup 4 of the bearing B2 are added together. A table for a typical mounting A appears in FIG. 4. Thus, each combination of a letter and numerical code leads to a single entry in the table. That entry represents the following, all added together algebraically:

(a) the nominal bearing standout g for the bearing B2 when unmounted;
(b) the deviation from the nominal bearing standout;
(c) the lateral removed due to the interference fit between the cone bore 4 of the bearing B2 and the end surface 38 of the spindle S when computed at the nominal values for the diameters c and f of the cone bore 4 and spindle surface 38, respectively;
(d) the further change in the lateral caused by the deviation in the cone bore diameter from its nominal value c;
(e) the lateral removed due to the interference fit between the cup outside surface 15 for the bearing B2 and the hub bore 30 when computed at the nominal values for the diameters d and e of the cup outer surface 15 and hub bore 30, respectively;
(f) the further change in the lateral caused by the deviation in the cup diameter from its nominal value d; and
(g) the desired amount of end play or preload expressed as an axial dimension.

Items a, c, e, and g remain the same for all mountings A of the same configuration. Item b varies from one bearing B2 to another and is represented by the alphabetical code. Items d and f likewise vary from one bearing B2 to another and are represented by the numerical codes. In short the algebraic summation of items a through f constitutes the distance from the cup from face 20 to the cone back face 12 for the bearing B2 when the two bearings B1 and B2 are mounted and in a condition of zero end play. Item g introduces the desired end play or preload expressed as an axial dimension. Thus, the sum Y of the items a through g, that is the entry derived for the table, less the measured dimension X between the cup front face 20 and the end face 42 of the spindle S provides the proper thickness Z for the shim pack 46; $Y - X = Z$.

To assemble the wheel mounting A with the proper setting for the bearings B1 and B2, the assembler first installs the cups 14 for the two bearings B1 and B2 in their respective hub bores 30. Inasmuch as an interference fit exists between the outer surface 15 of each cup 14 and its bore 30 in the hub H, the cups 14 must be pressed into their bores 30. As a consequence, the raceways 6 of the two cups 14 undergo some contraction.

The spindle S is further positioned in an upright condition with its cylindrical end surface 38 presented upwardly. Next, the cone 2 of the inner bearing B1 is heated sufficiently to expand it enough to pass over the raised surface 34 at the end of the surface 38. Indeed, the heated cone 2 is merely dropped over the surfaces 38 and 34 until its back face 12 bears against the shoulder 36. As the cone 2 cools, it contacts and tightly embraces the raised surface 34. Actually, the entire cone assembly 26 for the bearing B1 is installed over the raised surface 34 on the spindle S. Since the spindle S is in an upright position and the thrust rib 8 for the cone 2 of the bearing B1 is presented downwardly, the rollers 22 gravitate to a positio in which their large diameter end faces are against the thrust rib 8.

With the cone assembly 26 for the bearing B1 so positioned, the hub H, by means of an overhead crane, is lifted upwardly a sufficient distance to clear the upper end of the spindle S, and then it is lowered over the spindle S, allowing the two cups 14 to pass over the cylindrical end surface 38. Indeed, the hub H is lowered until the raceway 16 on the cup 14 for the bearing B1 seats against the rollers 22 of the previously installed cone assembly 26 (FIG. 3). The weight of the hub H acting through the tapered cup raceway 16 will seat the rollers 22 of the bearing B1 against the cone raceway 6 and also against the thrust rib 8. Being a tapered roller bearing, the bearing B1 supports the entire weight of the hub H, and when the hub H is so supported no end play exists in the bearing B1.

Next the end plate 40 is bolted to the upper end of the spindle S so that the abutment surface 42 of the late 40 now corresponds with the end face 33 of the spindle S and likewise constitutes a radial surface of the spindle S. Only a few of the bolts 44 need be used, since the end plate 40 is initially installed merely for measurement purposes. Once the end plate 40 is in position on the spindle S, the dimension X is measured, that is the distance between the front face 20 for the cup 14 of the outer bearing B2 and the abutment surface 42 for the end plate 40 (FIG. 3). Actually, several measurements are made around the cup 14 and end plate 40, and these measurements are averaged to obtain the dimension X, which in a typical case might be 0.720 inches. Alternatively, the dimension X may be measured from the front face 20 of the cup 14 for the bearing B2 to the end face 33 of the spindle S without the end plate 40 on the spindle S.

The assembler further notes the alphabetical and numerical codes on the front face of the cup 14 and theback face of the cone 2 for the bearing B2. If a separate numerical code is provided for both the cup 14 and cone 2, then the two separate codes are added together to obtain a single numerical code. The assembler now enters the table prepared specifically for the mounting A and derives the dimension Y from that table (FIG. 4). For example, the combined numerical code may be 2, representing a code deviation of 1 for the cone 2 and a code deviation of 1 for the cup 14. The alphabetical code, represennting the bearing standout deviation, might be B. For the combination of the alphabetical code B and the combined numerical code 2, the table entry is 0.739 which is the dimension Y. The measured dimension X is then substracted from the table dimension Y to obtain the thickness for the shim pack 46. In the example previously referred to, this would result in a shim pack having a thickness of 0.019 in. (0.739−0.720=0.019).

Once the thickness of the shim pack 46 is determined in the foregoing manner, the assembler obtains a shim pack 46 of that thickness and installs it. This requires loosening the few bolts 44 that formerly secured the end plate 40 and removing the end plate 40. The cone assembly 26 for the bearing B2 is then placed over the surface 38 of the spindle S and moved into cup 14 for the bearing B2, while the shim pack 46 is placed over the end face 33 of the spindle S. Next the end plate 40 is replaced and secured with the full complement of the bolts 44. The bearings B1 and B2 now have the proper setting, and additional measurements or checks are not necessary.

Of course, deviations from the nominal diameters e of the hub bore 30 and the nominal diameter f of the spindle end surface 38 will affect the contraction of the cup 14 and expansion of the cone 2, respectively, and this in turn will alter the laterals that are removed. Even so, the variaitons in the laterals are relatively minor and are capable of being accommodated in the bearings B1 and B2, for rarely are bearings B1 and B2 adjusted to a precise setting. Usually they are adjusted to within a range of preload or end play. The process does, however, cancel out the lateral removed by deviations in the diameter c of the cone bore 4 and in the diameter d of the cup outer surface 15 for the bearing B2.

For each specific type wheel or other mounting that is to be assembled, a separate table must be provided, since there are many variables that affect the lateral removed as a result of deviations in the cone bore diameter c and the cup diameter d. For example, a hollow spindle will expand the cone 2 less than a solid spindle, thereby decreasing the lateral that is removed as a result of deviation in the cone bore diameter c. Hence, another table would be required for a wheel mounting utilizing a spindle of that modification. Loose fits can be accommodated in the table for either the cone 2 or the cup 14 of the bearing B2 or both. Of course the table entry for a loose fit will amount to zero deviation for the cone 2 or cup 14 to which it applies.

Instead of measuring the dimension X from the front face of the cup 14 to the abutment face 42 of the end plate 40, the assembler may measure from a predetermined location on the raceway 16 of the outer cup 14 to the end face 33 and abutment face 42 which constitute a radial surface along the spindle S. This is best achieved by inserting a tapered plug gap into the cup 14 of the bearing B2 until the gage seats against the tapered raceway 16. Then the distance between the gage and the abutment face 42 is measured. In this case the unmounted bearing standout that is used in compiling the table is considered to be the distance between the gage and the back face 12 of the cone 2. This procedure has the advantage of cancelling out deviations in the diameter of the outer hub bore 30 and in the outer surface 15 of the cup 14.

In some applications where the cones 2 and cups 14 of the same size are used, the possibility exists for mismatching the components. For example, the mounting A may inadvertently be assembled such that the cup 14 of bearing B1 is matched with the cone 2 of bearing B2 and the cup 14 of bearing B2 with the cone 2 bearing of B1 bearing. If this occurs, compensation has to be made to the shim pack 46 predicated by the method described previously. In working out this compensation one has to know the deviation from nominal of each cone standout. The amount of compensation that has to be made to the shim pack 46 is by the amount of the difference in the cone standouts of the two cone assemblies 26. If such a situation can occur, then the deviation from nominal standout g can be marked on each cone and a chart prepared that will give a corrected shim pack dimension.

It may be advantageous to use a variation of the previous concept by composing a modified table such that the cups and cone assemblies do not have to be matched and can be mixed at random during shipping and assembly. For this table, a letter code only would be applied to the cup and would correspond to the combined lateral change effects of the cup standout deviation and the cup O.D. deviation. The cup standout deviation is that part of the bearing standout deviation which is attributable to slight variations in the axial distance between a predetermined location on the cup raceway 16 and the cup front face 20. Also, only a numerical code would be applied to the cone and the code would correspond to the lateral change effects of the cone standout deviation and the cone bore deviation. The cone standout deviation is that part of the bearing standout deviation which is attributable to slight variations in the axial distance between a predetermined location at the roller contact with the cup raceway 16 and the cone back face 12. The table again would contain all possible letter codes along its vertical entry column and all possible numerical codes along its horizontal entry line. This modified table approach would only be possible where it is practical to produce gages to measure the cup and cone standout deviations.

This invention is intended to cover all changes and modifications of the example of the invention herein chosen for purposes of the disclosure which do not constitute departures from the spirit and scope of the invention.

What is claimed is:

1. A process for assembling and setting a bearing arrangement that permits an inner member of a mounting to rotate relative to an outer member of the mounting or vice-versa and includes first and second bearings that are spaced apart along an axis of rotation, with each bearing including an inner race mounted on the inner member and having a back face and an outwardly presented raceway, an outer race mounted on the outer member and having a back face and an inwardly presented raceway surrounding the raceway of the inner race, and rolling elements arranged in a single row between the two raceways, there being an interference fit between at least one of the races for the second bearing and the member on which that race is mounted, each bearing being capable of taking thrust loading in the axial direction which causes the back faces of its two races to be urged toward each other, the two bearings being mounted in opposition so that the back faces for corresponding races of the two bearings face in opposite directions, whereby the bearing arrangement will accommodate thrust loading in both axial directions as well as radial loading; said process comprising: installing the inner race of the first bearing against an abutment on the inner member; installing the outer race of the first bearing against an abutment on the outer member; installing one race of the second bearing against an abutment on the member for that race; thereafter placing the first bearing under a thrust load to properly seat the rolling elements thereof against the raceways for that bearing so that no end play exists in the first bearing; measuring the axial distance between a location on said one race of the second bearing and a radial surface along the member on which the other race of the second bearing is to be mounted; noting from a code associated with the second bearing, deviations from the nominal value of the standout for that bearing and from the nominal value of the diameter of at least one surface on that bearing along which an interference fit exists; consulting a reference source which for various combinations of coded standout and interference fit deviations provides an axial dimension that reflects the algebraic sum of at least the nominal bearing standout, the deviation in the bearing standout, the lateral removed as a result of the interference fit at said one surface when the diameter of that surface is considered at its nominal value, the further lateral removed as a result of any deviation from the nominal value of the diameter of said one surface; selecting a spacer for installation against the radial surface that is along the member along which said other race of the second bearing is to be mounted, the thickness of the spacer being derived by algebraically combining the measured distance and the axial dimension derived from the reference source; installing said other race of the second bearing along the member for that race and into an operative position with respect to said one race of the second bearing; installing the spacer on the member on which said other race of the second bearing is mounted; and installing an abutment on the member on which said other race of the second bearing is mounted such that the abutment along with the spacer control the axial position of said other race of the second bearing along the member on which said other race is mounted.

2. A process for setting a pair of indirectly mounted tapered roller bearings located between a spindle and a hub or between similar members in a mounting to permit relative rotation between the spindle and the hub at a correct bearing adjustment, each bearing including a cone mounted on the spindle with its back face presented away from the other bearing, a cup mounted in the hub with its back face presented toward the other bearing, and tapered rollers arranged in a single row between the cup and the cone, the spindle having a stop against which the back face of the cone for the first of the two bearings is located and the hub having shoulders against which the back faces for the cups of the two bearings are located, an interference fit existing between the cup of the second of the bearings and the hub or between cone of the second bearing and the spindle, or both, said process comprising: installing the cups of the two bearings against their respective shoulders in the hub; installing the cone of the first bearing against the stop of the spindle; installing the hub over the spindle to bring the cup, the cone and the tapered rollers of the first bearing together; placing the first bearing under a thrust load to properly seat the rollers of that bearing against the cup and cone for that bearing so that no end play exists in the first bearing; measuring the axial distance between the front face of the cup for the second bearing and a radial surface along the spindle; noting from coded indicia associated with the second bearing, deviations from the nominal value of the standout for that bearing and from the nominal value of the diameter of at least one surface on the bearing along which an interference fit exists; consulting a reference source which for various combinations of standout deviation and an interference fit deviation provides an axial dimension that reflects the algebraic sum of at least the nominal bearing standout, the deviation in the bearing standout, the lateral removed as a result of the interference fit at said one surface when the diameter of that surface is considered at its nominal value, and the further lateral removed as a result of any deviation from the nominal value of the diameter of said one surface; selecting a spacer for installation against the radial surface along the spindle, the thickness of the spacer being derived by algebraically combining the measured distance and the axial dimension derived from the reference source; moving the cone and tapered rollers of the second bearing over the spindle and into the cup of the second bearing; installing the spacer on the spindle; and installing an abutment on the spindle opposite to the back face of the cone for the second bearing such that the spacer and abutment control the axial position of the cone for the second bearing on the spindle.

3. The process according to claim 2 wherein the first bearing is placed under a thrust load by positioning the spindle upright with the back face of the cone for the first bearing presented downwardly.

4. The process according to claim 3 wherein the thrust load is applied to the first bearing by positioning the spindle upright with the back face of the cone for the first bearing presented downwardly.

5. A process for setting a pair of indirectly mounted tapered roller bearings located between a spindle and a hub or between similar members to permit relative rotation between the spindle and the hub at a correct bearing adjustment, each bearing including a cone mounted on the spindle with its back face presented away from the other bearing, a cup mounted in the hub with its back face presented toward the other bearing, and tapered rollers arranged in a single row between the cup and the cone, the spindle having a stop against which the back face of the cone for the first of the two bearings is located and the hub having shoulders against which the back faces for the cups of the two bearings are located, an interference fit existing between the bore of the cone for the second bearing and the spindle, said process comprising: installing the cups of the two bearings against their respective shoulders in the hub; installing the cone for the first bearing against the stop on the spindle; installing the hub over the spindle to bring the cup, the cone, and the tapered rollers of the first bearing together; placing the first bearing under a thrust load to properly seat the rollers of that bearing against the cup and cone for that bearing so that no end play exists in the first bearing; measuring the axial distance between a location along the cup for the second bearing and a radial surface along the spindle; noting from coded indicia associated with the second bearing, deviations from the nominal value of the standout for that bearing and from the nominal value of the cone bore along which an interference fit exists for that bearing; consulting a reference source which, for various combinations of standout deviation and a cone bore deviations, provides an axial dimension that reflects the algebraic sum of at least the nominal bearing standout, the deviation in the bearing standout, the lateral removed as a result of the interference fit at said one surface when the cone bore is considered at its nominal value, the further lateral removed as a result of any deviation from the nominal value of the cone bore; selecting a spacer for installation against the radial surface along the spindle, the thickness of the spacer being derived by algebraically combining the measured distance and the axial dimension derived from the reference source; moving the cone and tapered rollers of the second bearing over the spindle and into the cup of the second bearing; installing the spacer on the spindle; and installing an abutment on the spindle opposite to the back face of the cone for the second bearing such that the spacer and abutment control the axial position of the cone for the second bearing on the spindle.

6. The process according to claim 5 wherein the location along the cup of the second bearing from which the axial distance is measured is the front face of the cup for the second bearing.

* * * * *

UNITED STATES PATENT AND TRADEMARK OFFICE
CERTIFICATE OF CORRECTION

PATENT NO. : 4,336,641

DATED : June 29, 1982

INVENTOR(S) : Ravi R. Bhatia

It is certified that error appears in the above-identified patent and that said Letters Patent are hereby corrected as shown below:

Column 1, line 34, "adjuted" should be "adjusted".

Column 2, line 44, "meausre" should be "measure".

Column 4, line 68, "surfaces" should be "surface".

Column 5, line 21, "core" should be "cone".

Column 6, line 17, "msut" should be "must".

Column 7, line 7, "core" should be "cone".

Column 8, line 19, "albegraically" should be "algebraically".

Column 8, line 48, "cup from" should be "cup front".

UNITED STATES PATENT AND TRADEMARK OFFICE
CERTIFICATE OF CORRECTION

PATENT NO. : 4,336,641

DATED : June 29, 1982

INVENTOR(S) : Ravi R. Bhatia

It is certified that error appears in the above-identified patent and that said Letters Patent are hereby corrected as shown below:

Column 9, line 11, "positio" should be "position".

Column 9, line 29, "late 40" should be "plate 40".

Column 9, line 48, "theback" should be "the back".

Column 10, line 44, "gap" should be "gage".

Signed and Sealed this

Ninth Day of November 1982

[SEAL]

Attest:

GERALD J. MOSSINGHOFF

Attesting Officer

Commissioner of Patents and Trademarks